US008377311B2

(12) United States Patent
Domke et al.

(10) Patent No.: US 8,377,311 B2
(45) Date of Patent: Feb. 19, 2013

(54) SELECTIVE MATERIALS SEPARATION USING MODIFIED MAGNETIC PARTICLES

(75) Inventors: Imme Domke, Mannheim (DE); Alexej Michailovski, Mannheim (DE); Norbert Mronga, Dossenheim (DE); Hartmut Hibst, Schriesheim (DE); Juergen Tropsch, Roemerberg (DE); Susanne Stutz, Weinheim (DE)

(73) Assignees: BASF SE, Ludwigshafen (DE); Seimens AG, Munich (DE)

( * ) Notice: Subject to any disclaimer, the term of this patent is extended or adjusted under 35 U.S.C. 154(b) by 207 days.

(21) Appl. No.: 13/054,713

(22) PCT Filed: Jul. 15, 2009

(86) PCT No.: PCT/EP2009/059015
§ 371 (c)(1),
(2), (4) Date: Jan. 18, 2011

(87) PCT Pub. No.: WO2010/007075
PCT Pub. Date: Jan. 21, 2010

(65) Prior Publication Data
US 2011/0120954 A1    May 26, 2011

(30) Foreign Application Priority Data

Jul. 18, 2008 (EP) .................................. 08160691

(51) Int. Cl.
*B03C 1/005* (2006.01)
(52) U.S. Cl. ........ 210/695; 210/679; 210/714; 210/724; 210/222; 209/5; 209/8; 209/9; 209/39; 209/214; 252/62.51 R
(58) Field of Classification Search .................. 210/679, 210/695, 714, 724, 222; 209/5, 8, 9, 39, 209/214; 252/62.51 R
See application file for complete search history.

(56) References Cited

U.S. PATENT DOCUMENTS

| 3,926,789 A | 12/1975 | Shubert |
| 4,657,666 A | 4/1987 | Snook et al. |
| 4,834,898 A | 5/1989 | Hwang |
| 5,051,199 A | 9/1991 | Barwise |
| 2008/0164140 A1 | 7/2008 | Ravishankar et al. |
| 2010/0200510 A1 | 8/2010 | Domke et al. |
| 2010/0300941 A1 | 12/2010 | Domke et al. |
| 2010/0307982 A1 | 12/2010 | Domke et al. |
| 2011/0000826 A1 | 1/2011 | Diez et al. |
| 2011/0120919 A1 | 5/2011 | Domke et al. |
| 2011/0229384 A1 | 9/2011 | Michailovski et al. |
| 2011/0240527 A1 | 10/2011 | Domke et al. |
| 2011/0272623 A1 | 11/2011 | Domke et al. |
| 2011/0303772 A1 | 12/2011 | Michailovski et al. |
| 2011/0303773 A1 | 12/2011 | Domke et al. |
| 2011/0309003 A1 | 12/2011 | Domke et al. |
| 2012/0000857 A1 | 1/2012 | Domke et al. |

FOREIGN PATENT DOCUMENTS

WO    02 066168    8/2002

OTHER PUBLICATIONS

Translation of the International Preliminary Report on Patentability for PCT/EP2009/059015, Apr. 13, 2011.*
Gray, S., et al., " Recovery of Fine Gold Particles by Flocculation with Hydrophobic Magnetite", Extractive Metallurgy Conference, pp. 223- 226 (Oct. 2-4, 1991).
International Search Report Issued Oct. 2, 2009 in PCT/EP09/059015 filed Jul. 15, 2009.

* cited by examiner

*Primary Examiner* — David A Reifsnyder
(74) *Attorney, Agent, or Firm* — Oblon, Spivak, McClelland, Maier & Neustadt, L.L.P.

(57) ABSTRACT

The present invention relates to a process of the invention for separating at least one first material from a mixture comprising this at least one first material and at least one second material, which comprises the steps:

(A) Contacting of at least one magnetic particle and at least one bifunctional molecule or an adduct of the two with the mixture comprising the at least one first material and at least one second material so that an adduct is formed from the at least one magnetic particle, the bifunctional compound of the general formula (I) and the at least one first material, (B) suspension of the adduct obtained in step (A) in a suitable suspension medium, (C) separation of the adduct present in the suspension from step (B) from the suspension by application of a magnetic field, (D) if appropriate, dissociation of the adduct separated off in step (C) in order to obtain the at least one first material.

a corresponding adduct and the use of such an adduct for the separation of mixtures of materials.

20 Claims, No Drawings

SELECTIVE MATERIALS SEPARATION USING MODIFIED MAGNETIC PARTICLES

The present invention relates to a process for separating at least one first material from a mixture comprising this at least one material and at least one second material, in which the mixture to be separated is brought into contact with at least one bifunctional compound and at least one magnetic particle so that an adduct is formed from the at least one first material, the bifunctional compound and the at least one magnetic particle, this adduct is dispersed in a suitable suspension medium, the adduct is separated off by application of a magnetic field and the adduct which has been separated off is, if appropriate, disassociated by suitable measures in order to obtain the at least one first material. The present invention further relates to corresponding adducts comprising particles comprising at least one metal oxide or semi metal oxide and a bifunctional compound and also their use for materials separation.

In particular, the present invention relates to a process for enriching ores in the presence of the gangue.

Processes for separating ores from mixtures comprising these are already known from the prior art.

WO 02/0066168 A1 relates to a process for separating ores from mixtures comprising these, in which suspensions or slurries of these mixtures are treated with particles which are magnetic and/or floatable in aqueous solutions. After addition of the magnetic and/or floatable particles, a magnetic field is applied so that the agglomerates are separated off from the mixture. However, the degree to which the magnetic particles are bound to the ores and the strength of the bond is not sufficient to carry out the process with satisfactory yield and effectiveness.

U.S. Pat. No. 4,657,666 discloses a process for the enrichment of ores, in which the ore present in the gangue is reacted with magnetic particles, so that agglomerates are formed as a result of the hydrophobic interactions. The magnetic particles are hydrophobicized on the surface by treatment with hydrophobic compounds, so that bonding to the ore occurs. The agglomerates are then separated off from the mixture by means of a magnetic field. The document mentioned also discloses that the ores are treated with a surface-activating solution of 1% of sodium ethylxanthogenate before the magnetic particle is added. Separation of ore and magnetic particle is in this process effected by destruction of the surface-activating substance which has been applied in the form of the surface-activating solution to the ore. A disadvantage of this process is that a surface-activating substance whose degradation products remain in the ore and may adversely affect further processing steps may be added.

U.S. Pat. No. 4,834,898 discloses a process for separating off nonmagnetic materials by bringing these into contact with magnetic reagents which are enveloped by two layers of surface-active substances. The bonding of the magnetic reagents which have been modified in this way to the nonmagnetic particles is based on interaction of the coating of the magnetic particles with the nonmagnetic materials. A disadvantage of this process is that the magnetic particles have to be provided with two layers of surface-active substances in a complicated fashion in order to achieve coupling.

S. R. Gray, D. Landberg, N. B. Gray, Extractive Metallurgy Conference, Perth, 2-4 Oct. 1991, pages 223-226, disclose a process for recovering small gold particles by bringing the particles into contact with magnetite. Before contacting, the gold particles are treated with potassium amylxanthogenate. A method of separating the gold particles from at least one hydrophilic material is not disclosed in this document.

It is an object of the present invention to provide a process by means of which at least one first material can be separated off efficiently from mixtures comprising at least one first material and at least one second material. Furthermore, the bond between the first material to be separated off and magnetic particles should be sufficiently stable to ensure a high yield of the first material in the separation.

The objects are achieved by the process of the invention for separating at least one first material from a mixture comprising this at least one first material and at least one second material, which comprises the steps:

(A) Contacting of at least one magnetic particle and at least one bifunctional molecule of the general formula (I)

$(F^1)_x\text{-}(A)_n\text{-}(F^2)_y$ (I), where $F^1$ is a functional group which selectively binds to the at least one magnetic particle, $F^2$ is a functional group which selectively binds to the at least one first material, A is a structural unit selected from among a $CRH_2$ group where R is selected from among hydrogen and linear or branched hydrocarbon radicals having from 1 to 30 carbon atoms, an aromatic or heteroaromatic unit, a cyclic or heterocyclic unit, an unsaturated, branched or unbranched carbon chain having from 2 to 30 carbon atoms, a heteroatom and combinations of the abovementioned structural units, n is an integer from 1 to 100, x is an integer from 1 to 4 and y is an integer from 1 to 4, or an adduct of the two with the mixture comprising the at least one first material and at least one second material so that an adduct is formed from the at least one magnetic particle, the bifunctional compound of the general formula (I) and the at least one first material, (B) suspension of the adduct obtained in step (A) in a suitable suspension medium, (C) separation of the adduct present in the suspension from step (B) from the suspension by application of a magnetic field, (D) dissociation or further processing of the adduct separated off in step (C) in order to obtain the at least one first material.

The process of the invention generally serves to separate at least one first material from a mixture comprising this at least one first material and at least one second material.

The at least one first material and the at least one second material can be separated from one another by the process of the invention since, according to the invention, at least one magnetic particle and at least one bifunctional compound of the general formula (I) are added to the mixture so that an adduct is formed from the at least one first material, the at least one bifunctional compound and the at least one magnetic particle and this adduct can then be separated off by application of a magnetic field.

The mixture from which the at least one first material is to be separated off comprises at least one second material in addition to this at least one first material. Apart from these components, the mixture can also comprise further materials.

In a preferred embodiment, the at least one first material is selected from the group consisting of sulfidic ores, oxidic and/or carbonate-comprising ores and mixtures thereof.

The at least one first material to be separated off is thus preferably a metal compound selected from the group consisting of sulfidic ores, oxidic and/or carbonate-comprising ores, for example azurite $[Cu_3(CO_3)_2(OH)_2]$ or malachite

[Cu₂[(OH)₂|CO₃]]. Furthermore, the at least one material to be separated off can be selected from the group consisting of the noble metals and their compounds, for example Au, Pt, Pd, Rh, etc, preferably in the native state.

Examples of sulfidic ores which can be used for the purposes of the invention are selected from the group consisting of sulfidic colored metal ores, for example copper ores such as covellite CuS, chalcopyrite (copper pyrite) $CuFeS_2$, bornite $Cu_5FeS_4$, chalcocite (copper glance) $Cu_2S$ and mixtures thereof, molybdenum ores such as molybdenum (IV) sulfide molybdite $MoS_2$, iron sulfides such as $FeS/FeS_2$, nickel ores such as NiS, lead ores such as PbS, zinc ores such as ZnS and mixtures thereof.

The at least one second material is preferably selected from the group consisting of oxidic metal and semimetal compounds, hydroxylic metal and semimetal compounds and mixtures thereof, for example silicon dioxide $SiO_2$, silicates, aluminosilicates, for example feldspars (Ba, Ca, Na, K, $NH_4$) (Al, B, Si)$_4O_8$, for example albite $Na(Si_3Al)O_8$ or anorthite ($CaAl_2Si_2O_8$), olivines (Mg, Fe)$_2SiO_4$, mica, for example muscovite $KAl_2[(OH,F)_2AlSi_3O_{10}]$, garnets $(X_3Y_2(SiO_4)_3$ where X=Mg, Ca, Fe(II), Mn(II) and Y=Al, Fe(III), Cr(III), Ti(III), V(III)), FeO(OH), $FeCO_3$ and further related minerals and mixtures thereof. Furthermore, oxidic compounds of metals and semimetals, for example borates or other salts of metals and semimetals, for example phosphates, sulfates or oxides/hydroxides/carbonates and further salts, for example azurite $[Cu_3(CO_3)_2(OH)_2]$, malachite $[Cu_2[(OH)_2(CO_3)]]$, barite ($BaSO_4$), monazite ((Ce, La, Nd) [$PO_4$]), can be present in the ore mixtures to be treated according to the invention.

Preference is given to the first material being $Cu_2S$ and the second material being $SiO_2$ in the process of the invention.

The process of the invention is preferably carried out using untreated ore mixtures which are obtained from mine deposits.

A typical ore mixture which can be separated by means of the process of the invention has the following composition: about 30% by weight of $SiO_2$, about 10% by weight of $Na(Si_3Al)O_8$, about 3% by weight of $Cu_2S$, about 1% by weight of $MoS_2$, balance chromium, iron, titanium and magnesium oxides.

In a preferred embodiment of the process of the invention, the mixture comprising at least one first material and at least one second material in step (A) is in the form of particles having a size of from 100 nm to 100 μm, see, for example, U.S. Pat. No. 5,051,199. In a preferred embodiment, this particle size is obtained by milling. Suitable processes and apparatuses are known to those skilled in the art, for example wet milling in a ball mill. In a preferred embodiment of the process of the invention, the mixture comprising at least one first material and at least one second material is milled to particles having a size of from 100 nm to 500 μm, preferably from 100 nm to 100 μm, during step (A).

The individual steps of the process of the invention are described in detail below:

Step (A):

Step (A) of the process of the invention comprises contacting of at least one magnetic particle and at least one bifunctional compound of the general formula (I)

(I), where $F^1$ is a functional group which selectively binds to the at least one magnetic particle, $F^2$ is a functional group which selectively binds to the at least one first material, A is a structural unit selected from among a $CRH_2$ group where R is selected from among hydrogen and linear or branched hydrocarbon radicals having from 1 to 30 carbon atoms, an aromatic or heteroaromatic unit, a cyclic or heterocyclic unit, an unsaturated, branched or unbranched carbon chain having from 2 to 30 carbon atoms, a heteroatom and combinations of the abovementioned structural units, n is an integer from 1 to 100, x is an integer from 1 to 4 and y is an integer from 1 to 4, or an adduct of the two with the mixture comprising the at least one first material and at least one second material so that an adduct is formed from the at least one magnetic particle, the bifunctional compound of the general formula (I) and, if appropriate, the at least one first material.

In a preferred embodiment of the process of the invention, the mixture comprising the at least one first material and at least one second material, the at least one bifunctional compound and the at least one magnetic particle are combined at the same time in step (A) so that the adduct of the three components is formed.

In a further preferred embodiment of the process of the invention, the mixture comprising the at least one first material and at least one second material and the at least one magnetic particle are firstly combined in step (A). The mixture is then preferably intimately mixed, for example milled, and the at least one bifunctional group is added before or during mixing so that the adduct of the three components is formed.

In a further preferred embodiment, the at least one bifunctional compound and the at least one magnetic particle are firstly combined in step (A), so that an adduct of these two components is formed. After an adduct has been formed from the at least one bifunctional compound and the at least one magnetic particle, this is brought into contact with the mixture to be treated so that the adduct of the three components is formed.

In a particularly preferred embodiment, step (A) of the process of the invention is carried out during milling of the mixture to be treated. Thus, in a particularly preferred embodiment, the mixture comprising at least one bifunctional compound and the at least one magnetic particle are introduced together into a suitable mill in step (A). Suitable processes and apparatuses for this purpose are known to those skilled in the art, for example wet milling in a ball mill.

In a further preferred embodiment of the process of the invention, the at least one magnetic particle and the at least one bifunctional compound are combined outside a mill, for example in a stirred apparatus, in step (A) and are only subsequently milled in the mill, if appropriate in the presence of the mixture comprising the at least one first material and at least one second material.

As magnetic particles, it is possible to use all magnetic particles which are known to those skilled in the art and meet the requirements of the process of the invention, for example dispersibility in the suspension medium used and the ability to bind to the functional group $F^1$ of the at least one bifunctional compound.

Furthermore, the magnetic particle should have a sufficiently high final magnetization and stability in the dispersion medium so that the adduct can be separated off in a sufficient amount from the suspension in step (C) of the process of the invention.

In a preferred embodiment, the at least one magnetic particle is selected from the group consisting of metallic metals, for example iron, cobalt, nickel and mixtures thereof, ferromagnetic alloys of magnetic metals, magnetic iron oxides, for example magnetite, maghemite, cubic ferrites of the general formula (II)

$$M^{2+}{}_xFe^{2+}{}_{1-x}Fe^{3+}{}_2O_4 \qquad (II)$$

where
M is selected from among Co, Ni, Mn, Zn and mixtures thereof and
$x \leq 1$,
hexagonal ferrites, for example calcium or strontium ferrite $MFe_6O_{19}$ where M=Ca, Sr, and mixtures thereof.

If a metallic magnetic particle is used, this is preferably provided with a protective coating, for example of $SiO_2$.

In a particularly preferred embodiment of the present application, the at least one magnetic particle is magnetite $Fe_3O_4$, for example natural magnetite.

The size of the magnetic particles used according to the invention is preferably from 100 nm to 100 μm. The at least one magnetic particle can also attain this size only during the milling which is preferably carried out in step (A).

The at least one bifunctional compound used according to the invention corresponds to the general formula (I)

$$(F^1)_x\text{-}(A)_n\text{-}(F^2)_y \qquad (I),$$

where
$F^1$ is a functional group which selectively binds to the at least one magnetic particle,
$F^2$ is a functional group which selectively binds to the at least one first material,
A is a structural unit selected from among a $CRH_2$ group where R is selected from among hydrogen and linear or branched hydrocarbon radicals having from 1 to 30 carbon atoms, an aromatic or heteroaromatic unit, a cyclic or heterocyclic unit, an unsaturated, branched or unbranched carbon chain having from 2 to 30 carbon atoms, a heteroatom and combinations of the abovementioned structural units,
n is an integer from 1 to 100, preferably from 1 to 20,
x is an integer from 1 to 4 and
y is an integer from 1 to 4.

$F^1$ and $F^2$ are each a functional group which selectively binds to the at least one magnetic particle ($F^1$) or to the at least one first material ($F^2$).

For the purposes of the present invention, "selectively" means that the corresponding functional group $F^1$ or $F^2$ binds to an extent of from 50 to 98%, preferably from 70 to 95%, particularly preferably from 80 to 95%, based on $F^1$ to the at least one magnetic particle or based on $F^2$ to the at least one first material, in each case in the presence of the at least one second material and in each case based on all bonds between functional groups and components present in the mixture.

In a preferred embodiment, $F^1$ is a functional group which selectively binds to the at least one magnetic particle in the presence of silicates, particularly preferably a functional group selected from among the phosphonic acid group —OP(OH)$_2$ and the carboxyl group —COOH.

In a further preferred embodiment, $F^2$ is a functional group which binds to the at least one first material in the presence of oxidic ores, for example the abovementioned $SiO_2$ or albite in particular, particularly preferably a functional group selected from the group consisting of the thiol group —SH, the hydroxy group —OH, the xanthogenate group —OCSSH, the thiolate group —S$^-$, a dihydroxy group, for example the 1,2-dihydroxy or 1,3-dihydroxy group, a dithiol group, for example the 1,2-dithiol or 1,3-dithiol group, a thiohydroxy group, for example the 1,2-thiohydroxy or 1,3-thiohydroxy group, functional groups of the general formula (III) and mixtures thereof

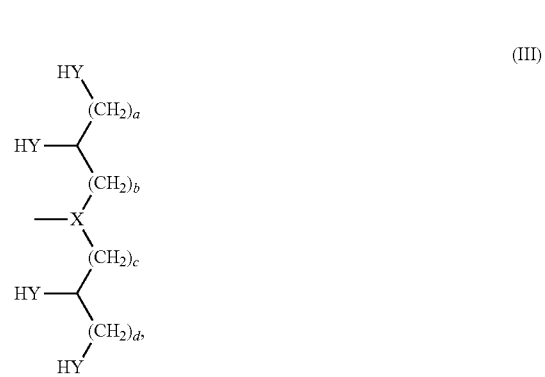

where
the radicals Y are each, independently of one another, S, NH, O, preferably, independently of one another, S or O,
X is N, P, $CH_2$, preferably N,
a, b, c, d are each, independently of one another, an integer from 1 to 6, preferably 1 or 2.

The functional groups $F^2$ of the general formula (III) are bound to $-(A)_n-$ via the free bond on X.

Very particularly preferred functional groups $F^2$ of the general formula (III) are selected from the group of compounds of the formulae (IIIa), (IIIb), (IIIc), (IIId) and (IIIe):

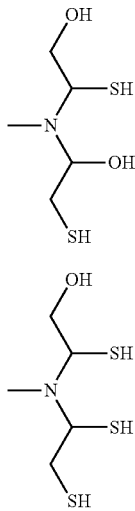

(IIId)

(IIIe)

In the general formula (I), A is a structural unit selected from among a CRH$_2$ where R is selected from among hydrogen and linear or branched hydrocarbon radicals having from 1 to 30 carbon atoms, an aromatic or heteroaromatic unit, a cyclic or heterocyclic unit, an unsaturated, branched or unbranched hydrocarbon chain having from 2 to 30 carbon atoms, a heteroatom and combinations of the abovementioned structural units, preferably a CH$_2$ group. According to the invention, it is also possible for —C—C— double and/or triple bonds to be present in the skeleton of the bifunctional compounds formed by -(A)$_n$-. Heteroatoms are, for example, O, S, N and/or P. Suitable aromatic or heteroaromatic units are, for example, selected from among substituted or unsubstituted aromatic or heteroaromatic units having from 6 to 20 carbon atoms and, if appropriate, heteroatoms, for example phenyl, benzyl and/or naphthyl. The aromatic units can be incorporated into the chain via the 1,2, 1,3 and/or 1,4 positions.

In the compound of the general formula (I), x and y indicate the number of functional groups F$^1$ or F$^2$ present in the molecule. Preference is given to x and y each being, independently of one another, 1, 2 or 3, particularly preferably 1 or 2, very particularly preferably 1.

A very particularly preferred compound of the general formula (I) is (2-mercaptophenyl)phosphonic acid

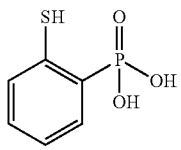

In a preferred embodiment of the process of the invention, the functional group F$^1$ in the compound of the general formula (I) binds to the at least one magnetic particle and the functional group F$^2$ in the compound of the general formula (I) binds to the at least one first material.

The contacting of at least one magnetic particle, at least one bifunctional compound of the general formula (I) and the mixture to be treated or of an adduct of at least one magnetic particle and at least one bifunctional compound of the general formula (I) and the mixture to be treated in step (A) of the process of the invention is generally carried out by all methods known to those skilled in the art which ensure that sufficient energy is introduced into the mixture to form the corresponding, above-described adducts. In a preferred embodiment of the process of the invention, the contacting in step (A) is effected by milling.

The molar ratio of at least one magnetic particle to at least one first material which is to be separated off from the mixture is generally set so that a sufficiently large amount of adduct can be formed in step (A). In a preferred embodiment, the molar ratio of at least one magnetic particle to at least one first material is at least one, particularly preferably at least 10.

The at least one bifunctional compound of the general formula (I) is generally added in an amount which allows a sufficiently large amount of adduct to be formed in step (A). The at least one bifunctional compound is preferably added in an amount of from 0.005 to 20% by weight, particularly preferably from 0.01 to 10% by weight, in each case based on the amount of the at least one first material.

Step (A) of the process of the invention is generally carried out at a temperature of from 0.5 to 90° C., preferably at ambient temperature. Step (A) of the process of the invention is generally carried out under atmospheric pressure, i.e. about 1 bar.

Step (B)

Step (B) of the process of the invention comprises suspension of the adduct obtained in step (A) in a suitable suspension medium.

In step (B) of the process of the invention, all suspension media in which the mixture from step (A) is not soluble to a significant extent are suitable as suspension media. Suitable suspension media for producing the suspension as per step (B) of the process of the invention are preferably selected from the group consisting of water, water-soluble organic compounds, for example alcohols having from 1 to 4 carbon atoms, and mixtures thereof. In a particularly preferred embodiment, the suspension medium in step (B) is water.

Step (B) of the process of the invention is generally carried out at a temperature of from 1 to 80° C., preferably from 20 to 40° C., particularly preferably at ambient temperature.

The amount of suspension medium can, according to the invention, generally be selected so that a suspension which is readily stirrable and/or conveyable is obtained in step (B). In a preferred embodiment, a suitable suspension medium is added so that a solids content of the suspension obtained of from 0.1 to 80% by weight, particularly preferably from 0.1 to 40% by weight, results.

Step (C)

Step (C) of the process of the invention comprises separation of the adduct present in the suspension from step (B) from the suspension by application of a magnetic field.

Step (C) can, in a preferred embodiment, be carried out by introducing a permanent magnet into the reactor in which the suspension from step (B) is present. In a preferred embodiment, a dividing wall composed of nonmagnetic material, for example the glass wall of the reactor, is located between permanent magnet and the mixture to be treated. In a further preferred embodiment of the process of the invention, an electromagnet which is only magnetic when an electric current flows is used in step (C). Suitable apparatuses are known to those skilled in the art.

Step (C) of the process of the invention can be carried out at any suitable temperature, for example from 10 to 60° C., preferably ambient temperature.

During step (C), the mixture is preferably continually thoroughly mixed by means of a suitable apparatus known to those skilled in the art.

After step (C) of the process of the invention, the adduct comprising at least one magnetic particle, at least one bifunctional compound and the at least one first material which is formed in step (A) of the process of the invention is present on the magnet or on a dividing wall located between magnet and adduct. In the case of an electromagnet, the adduct can be removed from the magnet by switching off the electric current, so that a magnetic field gradient is no longer present. If a dividing wall is present between the magnet and the suspension, the adduct can be removed by methods known to those skilled in the art.

After step (C), the at least one second material remaining in the suspension can, if appropriate, be separated off by all methods known to those skilled in the art, for example by draining off the parts of the suspension which are not held by the magnet through the bottom valve of the reactor utilized for step (C) or pumping away the parts of the suspension which are not held by the at least one magnet through a hose. The adduct comprising at least one magnetic particle, at least one bifunctional compound of the general formula (I) and the at least one first material can subsequently be removed as described above.

Step (D)

Step (D) of the process of the invention comprises the dissociation or further processing of the adduct separated off in step (C) in order to obtain the at least one first material.

In step (D), the adduct obtained in step (C) is either processed further, for example by roasting, or dissociated by suitable methods.

Roasting processes are known to those skilled in the art. In a preferred embodiment, the adduct is heated to a temperature of from 250 to 1500° C., preferably from 400 to 600° C. At the same time, oxygen, preferably in pure form, is blown into the molten adduct, for example through at least one oxygen lance. In a preferred embodiment, slag formers known to those skilled in the art are added to the adduct before roasting. During roasting, the organic constituents are oxidized and sulfidic ores are oxidized to oxidic ores. Suitable processes for separating the oxidic ores are known to those skilled in the art.

In general, step (D) can be carried out using all methods known to those skilled in the art which ensure that the adduct is preferably completely dissociated. In a preferred embodiment, the dissociation in step (D) of the process of the invention is effected by treating the adduct with at least one dissociating reagent.

In a further preferred embodiment, the adduct separated off in step (C) is dissociated by treatment with at least one oxidant, at least one reducing agent, at least one base and/or at least one acid. In general, all oxidants, reducing agents and/or bases known to those skilled in the art are suitable. Suitable oxidants are, for example, hydrogen peroxide ($H_2O_2$), chromates, permanganates, atmospheric oxygen, etc. Suitable reducing agents are, for example, hydrazine ($N_2H_4$), hydrogen ($H_2$), etc. Suitable bases are, for example, ammonia, triethylamine, milk of lime, NaOH, etc. Suitable acids are, for example, $H_2SO_4$, HCl, formic acid, acetic acid, etc.

In a preferred embodiment of the process of the invention, the adduct comprising at least one magnetic particle, at least one bifunctional compound of the general formula (I) and at least one first material which is obtained in step (C) is firstly resuspended in order to carry out the disassociation. Here, it is possible to use the same suspension media as used in step (B), preferably water.

After dissociation of the adduct, the at least one magnetic particle and the at least one first material are present in suspended form. These two materials can be separated from one another and from the suspension medium by all methods known to those skilled in the art.

The at least one magnetic particle is preferably separated off from the suspension comprising this at least one magnetic particle and the at least one first material by means of a permanent magnet or electromagnet. Details of this separation are analogous to step (C) of the process of the invention. After this separation, the at least one first material is preferably present in suspended form while the at least one magnetic particle adheres to the magnet.

The first material to be separated off, preferably the metal compound to be separated off, is preferably separated from the suspension medium by distilling off the solvent or filtration. The first material obtained in this way can be purified by further processes known to those skilled in the art. The suspension medium can, if appropriate after purification, be recirculated to the process of the invention. In a preferred embodiment, the at least one magnetic particle is likewise recirculated to step (A) of the process of the invention.

The present invention also provides an adduct of the general formula (IV)

$$M\text{-}[(F^1)_x\text{-}(A)_n\text{-}(F^2)_y]_z \qquad (IV),$$

where
M is a particle comprising at least one metal or semimetal,
$F^1$, $F^2$ are each, independently of one another, a functional group,
A is a structural unit selected from among a $CRH_2$ group where R is selected from among hydrogen and linear or branched hydrocarbon radicals having from 1 to 30 carbon atoms, an aromatic or heteroaromatic unit, a cyclic or heterocyclic unit, an unsaturated, branched or unbranched carbon chain having from 2 to 30 carbon atoms, a heteroatom and combinations of the abovementioned structural units,
n is an integer from 1 to 100,
x is an integer from 1 to 4,
y is an integer from 1 to 4 and
z is an integer from 1 to 200.

In the compound of the general formula (IV), M is generally a particle comprising at least one metal or semimetal, preferably in oxidic form.

In a preferred embodiment, M is a particle selected from the group consisting of magnetic particles, in particular selected from the group consisting of magnetic metals, for example iron, cobalt, nickel and mixtures thereof, ferromagnetic alloys of magnetic metals, magnetic iron oxides, for example magnetite, maghemite, cubic ferrites of the general formula (II)

$$M^{2+}_x Fe^{2+}_{1-x} Fe^{3+}_2 O_4 \qquad (II)$$

where
M is selected from among Co, Ni, Mn, Zn and mixtures thereof and
$x \leq 1$,
hexagonal ferrites, for example calcium or strontium ferrite $MFe_6O_{19}$ where M=Ca, Sr, and mixtures thereof.

In a particularly preferred embodiment of the present application, M is selected from the group consisting of magnetite $Fe_3O_4$, for example natural magnetite and mixtures thereof.

The size of the particle present in the adduct according to the invention of the general formula (IV) is preferably from 100 nm to 100 μm.

$F^1$ and $F^2$ are each, independently of one another, a functional group, with $F^1$ and the at least one particle M forming a bond.

In a particularly preferred embodiment, $F^1$ is a functional group selected from among the phosphonic acid group —OP(OH)$_2$ and the carboxyl group —COOH.

In a further preferred embodiment, $F^2$ is a functional group selected from the group consisting of the thiol group —SH, the hydroxy group —OH, the xanthogenate group —OCSSH, the thiolate group —S$^-$, a dihydroxy group, for example the 1,2-dihydroxy or 1,3-dihydroxy group, a dithiol group, for example the 1,2-dithiol or 1,3-dithiol group, a thiohydroxy group, for example the 1,2-thiohydroxy or 1,3-thiohydroxy group, functional groups of the general formula (III) and mixtures thereof

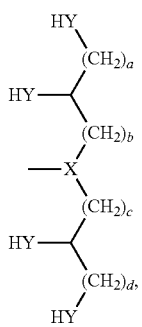

(III)

where the radicals Y are each, independently of one another, S, NH, O, preferably, independently of one another, S or O, X is N, P, CH$_2$, preferably N, a, b, c, d are each, independently of one another, an integer from 1 to 6, preferably 1 or 2.

The functional groups $F^2$ of the general formula (III) are bound to -(A)$_n$- via the free bond on X.

Very particularly preferred functional groups $F^2$ of the general formula (III) are selected from the group of compounds of the formulae (IIIa), (IIIb), (IIIc), (IIId) and (IIIe):

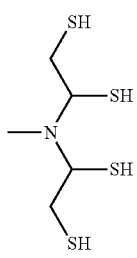

(IIIa)

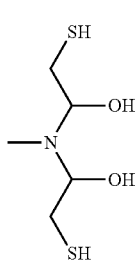

(IIIb)

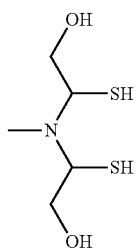

(IIIc)

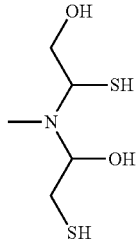

(IIId)

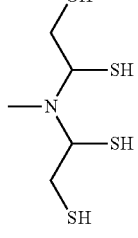

(IIIe)

In the general formula (IV), A is a structural unit selected from among a CRH$_2$ where R is selected from among hydrogen and linear or branched hydrocarbon radicals having from 1 to 30 carbon atoms, an aromatic or heteroaromatic unit, a cyclic or heterocyclic unit, an unsaturated, branched or unbranched hydrocarbon chain having from 2 to 30 carbon atoms, a heteroatom and combinations of the abovementioned structural units, preferably a CH$_2$ group. According to the invention, it is also possible for —C—C— double and/or triple bonds to be present in the skeleton of the bifunctional compounds formed by -(A)$_n$-. Heteroatoms are, for example, O, S, N and/or P. Suitable aromatic or heteroaromatic units are, for example, selected from among substituted or unsubstituted aromatic or heteroaromatic units having from 6 to 20 carbon atoms and, if appropriate, heteroatoms, for example phenyl, benzyl and/or naphthyl. The aromatic units can be incorporated into the chain via the 1,2, 1,3 and/or 1,4 positions.

In the general formula (IV), n indicates the number of CH$_2$ groups or heteroatoms present in the skeleton of the compound of the general formula (IV). n is preferably from 1 to 20, particularly preferably from 1 to 4.

In the compound of the general formula (IV), x and y indicate the number of functional groups $F^1$ or $F^2$ present in the molecule. Preference is given to x and y each being, independently of one another, 1, 2 or 3, particularly preferably 1 or 2, very particularly preferably 1.

Preferred values for z depend greatly on the size of the particle M present. For example, if a particle M having a size of about 100 nm is present, then z is preferably from 10 to 100. If the size of the particle M is 1 μm, then z is preferably, for example, from 1 to 3.

In a particularly preferred embodiment, the compound of the general formula (IV) is an adduct of at least one magnetic particle and (2-mercaptophenyl)phosphonic acid

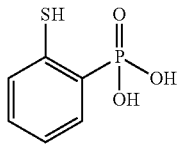

Adducts of the general formula (IV) can be used for separating at least one first material from a mixture comprising the at least one first material and at least one second material, for example by means of the process of the invention. The present invention therefore also provides for the use of an adduct of the general formula (IV) for the separation of mixtures of materials.

Furthermore, a compound of the general formula (I) can also be used for separating at least one first material from a mixture comprising the at least one first material and at least one second material, for example by means of the process of the invention. The present invention therefore also provides for the use of a compound of the general formula (I) for the separation of mixtures of materials.

EXAMPLES

Example 1

Production of an Adduct of a Magnetic Particle and (2-mercaptophenyl)phosphonic acid (2-mercaptophenyl)phosphonic acid is prepared as described in the literature method in Synthesis 1993; 5, 485-486. Magnetic pigment 345 (magnetite, diameter=4 µm, BASF SE) is used as magnetic particles.

The modification of the magnetic pigment 345 with the (2-mercaptophenyl)phosphonic acid is carried out by stirring 50 g of magnetic pigment 345 with 0.4 g (16 mmol) of (2-mercaptophenyl)phosphonic acid in 300 ml of water for 2.5 hours.

Example 2

Separation of a $Cu_2S/SiO_2$ Mixture 3 g of magnetic pigment 345 modified with (2-mercaptophenyl)phosphonic acid from example 1 are mixed with a mixture of 1 g of $Cu_2S$ (Aldrich, 325 mesh) and 30 g of $SiO_2$ (Riedel de Haen, $SiO_2$ powder) in water at 200 rpm for 1 hour. The nonmagnetic constituents are subsequently decanted off with a permanent magnet being fastened to the apparatus so as to hold back the magnetic constituents. The magnetic residue is washed once with acetone and dried overnight in a vacuum drying oven (1.10-3 mbar, 30° C.).

Elemental analysis of the dried residue indicates a recovery of 0.89 g of $Cu_2S$ (89% of $Cu_2S$). The amount of $SiO_2$ is 1.03 g (3.4%).

The invention claimed is:

1. A process for separating at least one first material from a mixture comprising the at least one first material and at least one second material, the process comprising:
(A) contacting at least one magnetic particle and at least one bifunctional molecule of formula (I)

$$(F^1)_x\text{-}(A)_n\text{-}(F^2)_y \qquad (I),$$

wherein
$F^1$ is a functional group which selectively binds the at least one magnetic particle, and is selected from the group consisting of phosphonic acid group —$OP(OH)_2$ and carboxylic acid group —$COOH_2$
$F^2$ is a functional group which selectively binds the at least one first material, and is at least one selected from the group consisting of a thiol group —SH, a hydroxy group —OH, a xanthogenate group —OCSSH, a thiolate group —$S^-$, a dihydroxy group, a dithiol group, a thiohydroxy group, and a functional group of formula (III)

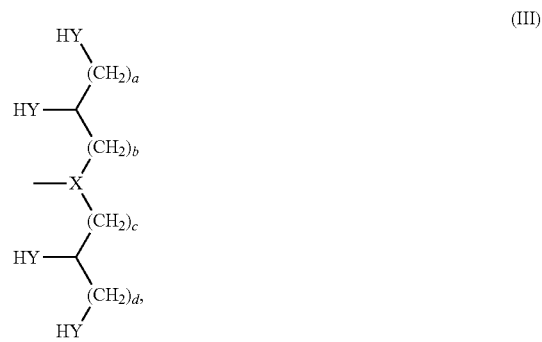

wherein
Y is independently S, NH, or O,
X is N, P, or $CH_2$,
a, b, c, d are each, independently of one another, an integer from 1 to 6,
A is at least one structural unit selected from the group consisting of a $CRH_2$ group where R is hydrogen or a linear or branched hydrocarbon radical having from 1 to 30 carbon atoms, an aromatic or heteroaromatic unit, a cyclic or heterocyclic unit, an unsaturated, branched or unbranched carbon chain having from 2 to 30 carbon atoms, and a heteroatom,
n is an integer from 1 to 100,
x is an integer from 1 to 4, and
y is an integer from 1 to 4,
or a product of the two,
with the mixture comprising the at least one first material and at least one second material, to form an adduct from the at least one magnetic particle, the bifunctional compound of formula (I) and the at least one first material;
(B) suspending the adduct obtained in the contacting (A) in a suitable suspension medium, to give a suspended adduct;
(C) separating the suspended adduct from the suspending (B) from the suspension by application of a magnetic field, to give a separated adduct;
(D) dissociating or further processing the separated adduct separated off in (C), in order to obtain the at least one first material.

2. The process of claim 1, wherein the at least one first material is at least one selected from the group consisting of a sulfidic ore, an oxidic ore, and a carbonate-comprising ore.

3. The process of claim 2, wherein the at least one second material is selected from the group consisting of an oxidic metal compound and a hydroxidic metal compound.

4. The process of claim 3, wherein the at least one magnetic particle is selected from the group consisting of a hexagonal ferrite, a magnetic metal, a ferromagnetic alloy of at least one magnetic metal, a magnetic iron oxide, and a cubic ferrite of formula (II)

wherein

M is at least one selected from the group consisting of Co, Ni, Mn, and Zn, and $x \leq 1$.

5. The process of claim 2, wherein the at least one magnetic particle is selected from the group consisting of a hexagonal ferrite, a magnetic metal, a ferromagnetic alloy of at least one magnetic metal, a magnetic iron oxide, and a cubic ferrite of formula (II)

wherein

M is at least one selected from the group consisting of Co, Ni, Mn, and Zn, and $x \leq 1$.

6. The process of claim 2, wherein the suspension medium is water.

7. The process of claim 1, wherein the at least one second material is selected from the group consisting of an oxidic metal compound and a hydroxidic metal compound.

8. The process of claim 7, wherein the at least one magnetic particle is selected from the group consisting of a hexagonal ferrite, a magnetic metal, a ferromagnetic alloy of at least one magnetic metal, a magnetic iron oxide, and a cubic ferrite of formula (II)

wherein

M is at least one selected from the group consisting of Co, Ni, Mn, and Zn, and $x \leq 1$.

9. The process of claim 7, wherein the suspension medium is water.

10. The process of claim 1, wherein the at least one magnetic particle is selected from the group consisting of a hexagonal ferrite, a magnetic metal, a ferromagnetic alloy of at least one magnetic metal, a magnetic iron oxide, and a cubic ferrite of formula (II)

wherein

M is at least one selected from the group consisting of Co, Ni, Mn, and Zn, and $x \leq 1$.

11. The process of claim 10, wherein the suspension medium is water.

12. The process of claim 10, wherein the first material is $Cu_2S$ and the second material is $SiO_2$.

13. The process of claim 1, wherein the suspension medium is water.

14. The process of claim 1, wherein the first material is $Cu_2S$ and the second material is $SiO_2$.

15. The process of claim 1, wherein the at least one first material comprises a sulfidic ore.

16. The process of claim 1, wherein the at least one first material comprises an oxidic ore.

17. The process of claim 1, wherein the at least one first material comprises a carbonate-comprising ore.

18. An adduct of formula (IV)

wherein

M is a particle comprising at least one metal or semimetal, $F^1$ and $F^2$ are each, independently of one another, a functional group, wherein $F^1$ is selected from the group consisting of a phosphonic acid group —$OP(OH)_2$ and a carboxylic acid group —COOH, and $F^2$ is at least one selected from the group consisting of a thiol group —SH, a hydroxy group —OH, a xanthogenate group —OCSSH, a thiolate group —$S^-$, a dihydroxy group, a dithiol group, a thiohydroxy group, and a functional group of formula (III);

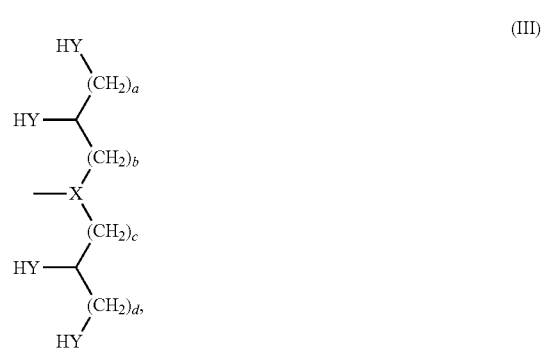

wherein

Y is independently S, NH, or O,

X is N, P, or $CH_2$, a, b, c, d are each, independently of one another, an integer from 1 to 6, A is at least one structural unit selected from a $CRH_2$ group where R is hydrogen or a linear or branched hydrocarbon radicals having from 1 to 30 carbon atoms, an aromatic or heteroaromatic unit, a cyclic or heterocyclic unit, an unsaturated, branched or unbranched carbon chain having from 2 to 30 carbon atoms, and a heteroatom, n is an integer from 1 to 100, x is an integer from 1 to 4, y is an integer from 1 to 4, and z is an integer from 1 to 200.

19. A method of adhering an adduct to at least one component of a mixture, comprising contacting the adduct of claim 18 with the mixture.

20. A method of adhering a compound to a magnetic particle, the method comprising contacting the compound and the particle, wherein the compound is of formula (I)

wherein $F^1$ is a functional group which selectively binds the at least one magnetic particle, and is selected from the group consisting of phosphonic acid group —$OP(OH)_2$ and carboxylic acid group —$COOH_2$ $F^2$ is a functional group which selectively binds the at least one first material, and is at least one selected from the group consisting of a thiol group —SH, a hydroxy group —OH, a xanthogenate group —OCSSH, a thiolate group —S⁻, a dihydroxy group, a dithiol group, a thiohydroxy group, and a functional group of formula (III)

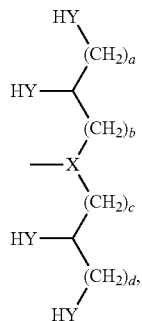
(III)

wherein
Y is independently S, NH, or O,
X is N, P, or $CH_2$,
a, b, c, d are each, independently of one another, an integer from 1 to 6,
A is at least one structural unit selected from the group consisting of a $CRH_2$ group where R is hydrogen or a linear or branched hydrocarbon radical having from 1 to 30 carbon atoms, an aromatic or heteroaromatic unit, a cyclic or heterocyclic unit, an unsaturated, branched or unbranched carbon chain having from 2 to 30 carbon atoms, and a heteroatom,
n is an integer from 1 to 100,
x is an integer from 1 to 4, and
y is an integer from 1 to 4.

* * * * *

UNITED STATES PATENT AND TRADEMARK OFFICE
CERTIFICATE OF CORRECTION

PATENT NO. : 8,377,311 B2
APPLICATION NO. : 13/054713
DATED : February 19, 2013
INVENTOR(S) : Imme Domke et al.

It is certified that error appears in the above-identified patent and that said Letters Patent is hereby corrected as shown below:

On the title page, Item (73), the Assignees' should read:

--(73) Assignees: BASF SE, Ludwigshafen (DE);
                     Siemens AG, Muenchen (DE)--

Signed and Sealed this
Ninth Day of July, 2013

Teresa Stanek Rea
*Acting Director of the United States Patent and Trademark Office*